United States Patent
Hakola et al.

(10) Patent No.: US 12,507,180 B2
(45) Date of Patent: Dec. 23, 2025

(54) ON FACILITATING MPE INDICATION IN LAYER 2 PHR REPORTING

(71) Applicant: Nokia Technologies Oy, Espoo (FI)

(72) Inventors: Sami-Jukka Hakola, Kempele (FI); Samuli Turtinen, II, Ii (FI); Kyoungmin Park, Suji gu (KR); Tero Henttonen, Espoo (FI); Samantha Caporal Del Barrio, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 552 days.

(21) Appl. No.: 17/917,998

(22) PCT Filed: May 18, 2021

(86) PCT No.: PCT/FI2021/050358
§ 371 (c)(1),
(2) Date: Oct. 10, 2022

(87) PCT Pub. No.: WO2021/234223
PCT Pub. Date: Nov. 25, 2021

(65) Prior Publication Data
US 2023/0143727 A1    May 11, 2023

Related U.S. Application Data

(60) Provisional application No. 63/028,604, filed on May 22, 2020.

(51) Int. Cl.
H04W 52/36 (2009.01)
H04B 7/06 (2006.01)
H04W 52/14 (2009.01)

(52) U.S. Cl.
CPC ........ H04W 52/365 (2013.01); H04B 7/0696 (2023.05); H04W 52/146 (2013.01); H04W 52/367 (2013.01)

(58) Field of Classification Search
CPC .................................................. H04W 52/365
See application file for complete search history.

(56) References Cited

U.S. PATENT DOCUMENTS

2018/0167897 A1    6/2018    Sampath et al.
2019/0261289 A1    8/2019    Raghavan et al.
(Continued)

OTHER PUBLICATIONS

Extended European Search Report received for corresponding European Patent Application No. 21807839.2, dated May 28, 2024, 6 pages.
(Continued)

*Primary Examiner* — Hsinchun Liao
(74) *Attorney, Agent, or Firm* — Barta Jones, PLLC (57) ABSTRACT

Example embodiments of the invention as disclosed herein for at least a method performed by an apparatus for determining a power limiting state for a candidate uplink beam pair of at least one candidate uplink beam pair configured for a user equipment of a communication network; based at least on the determining, causing configuration of a different candidate uplink beam pair of the at least one candidate uplink beam pair for communicating towards the communication network; and based on the determining communicating at least one power headroom report for the candidate uplink beam pair based on the power limiting state.

16 Claims, 5 Drawing Sheets

(56) References Cited

U.S. PATENT DOCUMENTS

2019/0305830 A1\* 10/2019 Zhou .................. H04B 7/088
2020/0068493 A1   2/2020 Ding et al.
2021/0204229 A1\* 7/2021 Miao .................. H04W 52/365

OTHER PUBLICATIONS

"[Draft] LS on MPE enhancements", TSG-RAN Working Group 4 (Radio) #94-e, R4-2002916, Nokia, Feb. 24-Mar. 6, 2020, 1 page.

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.

International Search Report and Written Opinion received for corresponding Patent Cooperation Treaty Application No. PCT/FI2021/050358, dated Aug. 30, 2021, 13 pages.

"UL beam selection improvements", 3GPP TSG-RAN WG1 Meeting #95, R1-1813609, Agenda: 7.2.8.6, Ericsson, Nov. 12-16, 2018, pp. 1-4.

\* cited by examiner

FIG.1

| R | R | PH (TYPE 1, Pcell) |
|---|---|---|
| R | R | $P_{cmax,f,c}$ |
| R | R | P–MPR |
| R | SPATIAL RELATION RS OR UPLINK BEAM PAIR LINK ID ||

FIG.2

| | R | R | PH (TYPE 1, Pcell) |
|---|---|---|---|
| | R | R | $P_{cmax,f,c}$ |
| | R | R | P–MPR |
| BIT-1 INDICATES THAT THERE IS ADDITIONAL MPE INDICATION FOR ANOTHER BEAM PAIR LINK | 1 | SPATIAL RELATION RS OR UPLINK BEAM PAIR LINK ID ||
| | R | R | $P_{cmax,f,c}$ |
| BIT-0 INDICATES THAT THERE IS NO ADDITIONAL MPE INDICATION FOR ANOTHER BEAM PAIR LINK | R | R | P–MPR |
| | 0 | SPATIAL RELATION RS OR UPLINK BEAM PAIR LINK ID ||

ON FACILITATING MPE INDICATION IN LAYER 2 PHR REPORTING

RELATED APPLICATION

This application was originally filed as PCT Application No. PCT/FI2021/050358, filed on May 18, 2021, which claims priority from U.S. Application No. 63/028,604, filed on May 22, 2020, each of which is incorporated herein by reference in its entirety.

TECHNICAL FIELD

The teachings in accordance with the exemplary embodiments of this invention relate generally to providing at least that a network device is configured to determine whether to transmit a power headroom report using a different beam pair link than for which the power headroom report is calculated and, more specifically, relate to a network device being configured to determine whether to transmit a power headroom report using a different beam pair link than for which the power headroom report is calculated when certain conditions are fulfilled.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
ACK acknowledgement
DL Downlink
FR2 frequency range 2
gNB 5G Node B
MPE Maximum Permissible Exposure
MPR Maximum Power Reduction
P-MPR Power Management MPR
PHR Power Headroom
PUCCH Physical Uplink Control Channel
PUSCH Physical Uplink Shared Channel
RAN Radio Access Network
RS Reference Signal
RSRP Reference Signal Received Power
TRP Transmission and Reception Point
TX Transmit
UE User Equipment
UL Uplink At the time of this application discussions are occurring regarding adapting multiple access technologies for various telecommunication standards to provide common protocols enabling different user equipment to communicate on a global level.

In some these discussions there is proposed adaptations to operations associated with Maximum Permissible Exposure (MPE) limits imposed on some communications devices. Such exposure limits are imposed to limit Radio Frequency (RF) radiation from wireless devices.

Example embodiments of the invention work to at least provide improved operations associated with at least these types of MPE limits.

SUMMARY SECTION

In an example aspect of the invention, there is an apparatus, such as a network side apparatus, comprising: at least one processor; and at least one memory including computer program code, where the at least one memory and the computer program code are configured, with the at least one processor, to cause the apparatus to at least: determine a power limiting state for a candidate uplink beam pair of at least one candidate uplink beam pair configured for a user equipment of a communication network; and based at least on the determining, cause configuration of a different candidate uplink beam pair of the at least one candidate uplink beam pair for communicating towards the communication network; and communicating at least one power headroom report for the candidate uplink beam pair based on the power limiting state.

In another example aspect of the invention, there is a method comprising: determining a power limiting state for a candidate uplink beam pair of at least one candidate uplink beam pair configured for a user equipment of a communication network; and based at least on the determining, causing configuration of a different candidate uplink beam pair of the at least one candidate uplink beam pair for communicating towards the communication network; and communicating at least one power headroom report for the candidate uplink beam pair based on the power limiting state.

A further example embodiment is an apparatus and a method comprising the apparatus and the method of the previous paragraphs, wherein the power limiting state is based on at least one of a maximum power reduction operation caused by a maximum permissible exposure constraint for the candidate uplink beam pair exceeding a threshold, wherein the power limiting state is based on a negative power headroom determination for the candidate uplink beam pair, wherein causing the configuration of the different candidate uplink beam pair for communicating the at least one power headroom report is based on at least one of: determining the at least one power headroom report is negative due to the maximum permissible exposure constraint, determining that a power level reduction of the maximum power reduction operation caused by a maximum permissible exposure constraint exceeds a predetermined threshold, or determining that a measured metric of spatial relation reference signal of the candidate uplink beam pair is below a predetermined threshold, wherein the spatial source reference signal (RS) can be one of an uplink or downlink reference signal, and wherein the spatial source reference signal is used by the user equipment to determine a candidate uplink beam pair, wherein for a case the spatial source reference signal is a downlink reference signal the user equipment uses a beam for reception of the downlink reference signal as the transmit beam for a candidate uplink beam pair, wherein the measured metric comprises at least one of channel state information (CSI), reference signal received power (RSRP), Reference Signal Received Quality (RSRPQ), or Reference signal to noise and interference ratio (RS-SINR) metrics, wherein the communicating comprises the user equipment indicating the different candidate uplink beam pair of the at least one candidate uplink beam pair over which the at least one power headroom report is communicated, wherein the communicating over the different candidate uplink beam pair is based on at least one of: spatial relation information of the different candidate uplink beam pair, a PUCCH group index associated with the different candidate uplink beam pair, a pathloss reference signal associated with the different candidate uplink beam pair, or a logical index of at least one current active candidate uplink beam pair, wherein the communicating comprises: multiplexing over the different candidate uplink beam pair the at least one power headroom report using a medium access control element, wherein the communicating comprises: implementing at least one extension field for the medium access control element, wherein the at least one extension field comprises indications of at least one of: a power headroom report for the different candidate uplink beam pair, a power headroom report for a given cell, or a virtual power headroom report for a candidate uplink beam pair not used to communicate the power headroom report, wherein the given cell is identified based on at least one of a spatial relation reference signal or uplink beam pair link identification, wherein the at least one candidate uplink beam pair comprises multiple candidate uplink beam pairs, wherein the implementing comprises implementing two bits for the medium access control element, wherein the two bits comprises: a first bit for indicating an additional maximum permissible exposure indication for another candidate uplink beam pair, and a second bit for indicating there is no additional maximum permissible exposure indication for another candidate uplink beam pair, wherein the at least one power headroom report comprises more than one power headroom report, wherein each of the more than one headroom report is for a different one of the more than one power headroom report, and/or, wherein there is for a case that a power level reduction level of any of the at least one candidate uplink beam pair is under the predetermined threshold, the communicating is using the at least one candidate uplink beam under the predetermined threshold.

A non-transitory computer-readable medium storing program code, the program code executed by at least one processor to perform at least the method as described in the paragraphs above.

In another example aspect of the invention, there is an apparatus comprising: means for determining a power limiting state for a candidate uplink beam pair of at least one candidate uplink beam pair configured for a user equipment of a communication network; based at least on the determining, causing configuration of a different candidate uplink beam pair of the at least one candidate uplink beam pair for communicating towards the communication network; and means for communicating at least one power headroom report for the candidate uplink beam pair based on the power limiting state.

In accordance with the example embodiments as described in the paragraph above, at least the means for determining and causing comprises a network interface, and computer program code stored on a non-transitory computer-readable medium and executed by at least one processor.

A communication system comprising the apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In this invention, there is proposed at least a novel method for determining by a network device whether to transmit a power headroom report using a different beam pair link than for which the power headroom report is calculated when certain conditions are fulfilled.

In certain situations, a certain type or percentage of a wave beam from a handheld device directed toward a person's body may violate an MPE limit. Solutions include a back-off of signalling of such devices in order to be compliant with the MPE limit. It is noted that these limits can impose clear restrictions on a link capacity and impact a communication range of a device as well. To improve safety, some governing bodies have placed restrictions on a peak signal level that can be directed toward the human body. These restrictions are sometimes referred to as maximum permissible exposure (MPE) limitations, MPE constraints, and/or the like.

Example embodiments of the invention relate to 3GPP NR design that can use similar MPE limits. More specifically, certain example embodiments of the invention focus on solving problem regarding UE's indication about MPE situation at the UE using the L2 based signalling. In a previous release RAN4 has provided an LS to RAN2 to indicate need for the signalling support as follows:

---

RAN4 has agreed further details on Rel-16 FR2 MPE enhancement solutions to mitigate RLF due to sudden and unpredictable large back off caused UE's actions to ensure compliance with exposure regulation. RAN4 would like to ask RAN2 to develop the following Rel-16 FR2 MPE
signalling based on MAC-CE to ensure sufficiently short signalling delays:
at least UE's P-MPR based event-triggered reporting including also reporting of the actual P-MPR level that UE needs for FR2 MPE reasons.
Network configurable P-MPR reporting threshold
A prohibit timer is enabled to be configured by network to trigger the P-MPR reporting
P-MPR reporting range and reporting granularity are still under discussion in RAN4.

---

It is noted that a RAN4 described solution to signal P-MPR reflecting MPE issue at the UE to the gNB is assumed to be provided together with/alongside existing Power Head Room (PHR) reporting. In FR2, which is the targeted frequency range for MPE indication, the UE may be configured more than one active beam pair link, e.g. to different TRPs, in order to provide robustness against sudden blockages and beam pair misalignment between gNB and UE due to mobility and rotation of the UE. The MPE can be considered directional, or in other words, can be considered beam and/or panel specific in FR2 where the UE operates using narrow beams for downlink and uplink.

Power Headroom (PH) reporting provides information for the link (in this context for the beam pair link) used to transmit the PHR. The problem now arises that when the MPE becomes an issue for the link (beam pair link in this context) the required power backoff that high that available transmission power would be too low for the PUSCH transmission (especially in cell edge conditions).

Furthermore, gNB determines and configures UL TX beams for the UE based on DL RS measurements and reported RSRP values. However, RSRP value does not reveal anything about possible MPE issue if the UE used that DL RS to determine UL TX beam. Thus, enhanced PHR reporting would be the way to provide, though reactively, information to the gNB that UE has faced MPE issue when using the certain beam pair link. However, as said above, that link in question may require such high power backoff that PUSCH transmission carrying PHR may not be receivable at the gNB.

It's also to be noted that while UE notices that one beam pair link has faced MPE issue and would be subject to significant power backoff there are no means for the UE to indicate gNB about it. E.g. there is no UL based beam failure recovery where upon detection of deteriorated quality of the spatial relation RS for the UL resource would trigger beam failure recovery.

Current PHR reporting is designed for the system where UE is having "one radio link" per serving cell. However, problems to be addressed can be seen to be that in FR2 and in general in beam based system, the UE may have multiple (candidate) beam pair links for the serving cell in uplink.

For at least this reason example embodiments of the invention provide at least that the UE is configured to determine whether to transmit PHR report using a different beam pair link than for which the PHR is calculated, e.g. when certain conditions are fulfilled.

Figure 1:
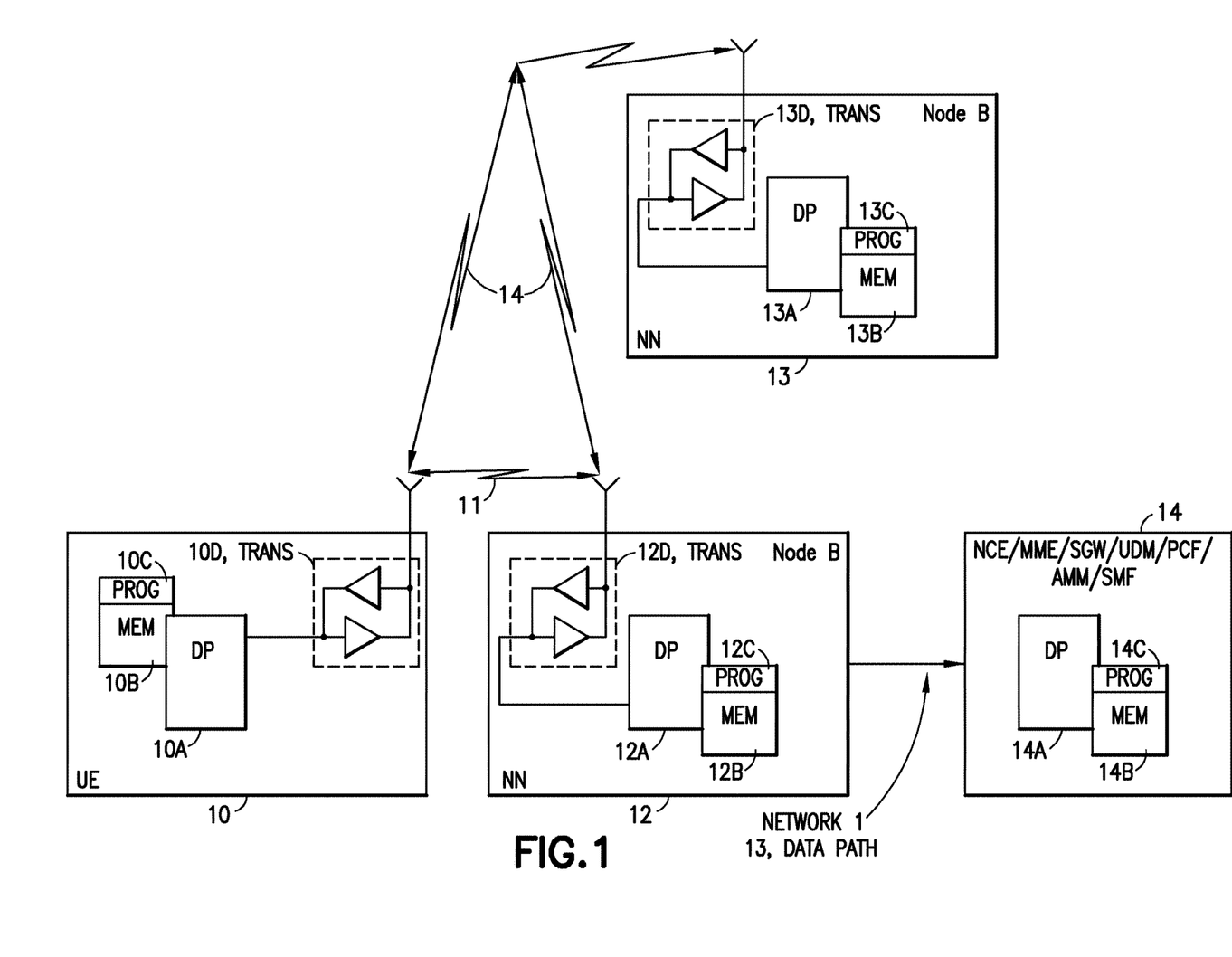
FIG. 1 shows a high level block diagram of various devices used in carrying out various aspects of the invention.

However, before describing the example embodiments of the invention in detail, reference is made to FIG. 1 for illustrating a simplified block diagram of various electronic devices that are suitable for use in practicing the example embodiments of this invention.

FIG. 1 shows a block diagram of one possible and non-limiting exemplary system in which the example embodiments of the invention may be practiced. In FIG. 1, a user equipment (UE) 10 is in wireless communication with a wireless network 1. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 18 to NN 12 and NN 13, respectively. The one or more memories MEM 10B include computer program code PROG 10C. The UE 10 communicates with NN 12 and/or NN 13 via a wireless link 111.

The NN 12 (NR/5G Node B, an evolved NB, eNB, gNB, or LTE device) is a network node such as a master or secondary node base station (e.g., for NR or LTE long term evolution) that communicates with devices such as NN 13 and UE 10 of FIG. 1. The NN 12 provides access to wireless devices such as the UE 10 to the wireless network 1. The NN 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13. Further, the link 11 and or any other link may be wired or wireless or both and may implement, e.g., an X2 or Xn interface. Further the link 11 may be through other network devices such as, but not limited to an NCE/SGW//AMF/UPF device such as the NCE/MME/SGW/UDM/PCF/AMM/SMF 14 of FIG. 1. The NN 12 may perform functionalities of an MME (Mobility Management Entity) or SGW (Serving Gateway), such as a User Plane Functionality, and/or an Access Management functionality for LTE and similar functionality for 5G The NN 13 can comprise a mobility function device such as an AMF or SMF, further the NN 13 may comprise a NR/5G Node B or possibly an evolved NB a base station such as a master or secondary node base station (e.g., for NR or LTE long term evolution) that communicates with devices such as the NN 12 and/or UE 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the NN 12 and the UE 10 or any other device using, e.g., link 11 or another link. These links may be wired or wireless or both and may implement, e.g., an X2 or Xn interface. Further, as stated above the link 11 may be through other network devices such as, but not limited to an NCE/MME/SGW device such as the NCE/MME/SGW/UDM/PCF/AMM/SMF 14 of FIG. 1.

The one or more buses of the device of FIG. 1 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and the one or more buses 157 could be implemented in part as fiber optic cable to connect the other elements of the NN 12 to a RRH.

It is noted that although FIG. 1 shows a network nodes Such as NN 12 and NN 13. Any of these nodes may can incorporate or be incorporated into an eNodeB or eNB or gNB such as for LTE and NR, and would still be configurable to perform example embodiments of the invention. Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a NCE/MME/SGW/UDM/PCF/AMM/SMF 14 that may include (NCE) network control element functionality, MME (Mobility Management Entity)/SGW (Serving Gateway) functionality, and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility Management (AMM) functionality, and/or Session Management (SMF) functionality, and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF 190 is configurable to perform operations in accordance with example embodiments of the invention in any of an LTE, NR, 5G and/or any standards based communication technologies being performed or discussed at the time of this application. In addition, it is noted that the operations in accordance with example embodiments of the invention, as performed by the NN 12 and/or NN 13, may also be performed at the NCE/MME/SGW/UDM/PCF/AMM/SMF 14.

The NCE/MME/SGW/UDM/PCF/AMM/SMF 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM 14B and the computer program code PROG 14C are configured to, with the one or more processors DP 14A, cause the NCE/MME/SGW/UDM/PCF/AMM/SMF 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the UE 10, NN 12, NN 13, and other functions as described herein.

As similarly stated above, in accordance with example embodiments of the invention a UE can be configured to determine whether to transmit PHR report using a different beam pair link than for which the PHR is calculated, e.g. when certain conditions are fulfilled.

Such conditions for the determining could be based on, for example:
   Power headroom would be negative and/or P-MPR (e.g. due to MPE or other reasons) is greater than predefined or configured value; and/or
   Measured metric (e.g. CSI/RSRP/RSRQ/RS-SINR) of the spatial relation RS that is utilized (e.g. configured, activated or indicated) for the uplink for which the PHR is calculated goes below the certain (pre-defined or configured) threshold This could be achieved by restricting the UE not to multiplex PHR MAC CE on a beam pair link for which the conditions are fulfilled above. Additionally or alternatively, a scheduling request procedure could be used to request resources on the beam pair link in which the PHR MAC CE could be multiplexed.

The PHR could report PH for the beam pair link used to transmit the PHR as well. The real PH could be calculated for the beam pair link used to transmit the PHR while virtual PH could be calculated for the beam pair link that the UE additionally reports in the PHR.

In the PHR report the UE indicates for which beam pair link this certain PHR would be addressed. Identification could be based on, for example:
   Spatial relation info of the considered beam pair link, i.e. DL or UL RS index;
   PUCCH group index (in case PUCCH resources are grouped for configured spatial relations e.g. TRP wise);
   Pathloss reference RS associated to the considered beam pair link, i.e. certain DL RS; and/or
   Logical index of current active UL beam pair links The indication can also be sent to indicate that there is no anymore MPE issue on certain beam pair link.

Example embodiments of the invention provide at least a new functionality the PHR that can be provided for another beam pair link than using which it's transmitted per serving cell. Especially in multi-TRP scenario the UE may be provided multiple candidate beam pair links e.g. for connection robustness.

In these novel operations, the P-MPR reporting due to MPE may also be transmitted separately from PHR, for example, in a separate MAC CE defined for MPE/P-MPR reporting.

The following steps could be considered for the UE to implement the invention:
1. PHR and/or MPE/P-MPR reporting is triggered for the beam pair link for which the P-MPR or similar due to MPE has become larger than configured threshold;
2. UE determines that due to MPE the beam pair link through which the PHR would be transmitted is having too low quality where determination is based on the measurement on the spatial relation RS or pathloss reference RS of the beam pair link in question; and/or
3. UE prepares PHR for the impacted beam pair link and transmits PHR on the other uplink beam pair link which does not suffer too high MPR. The PH value calculated for the impacted beam pair link may be a virtual PH value or a PH value based on a reference format.

Figure 2:
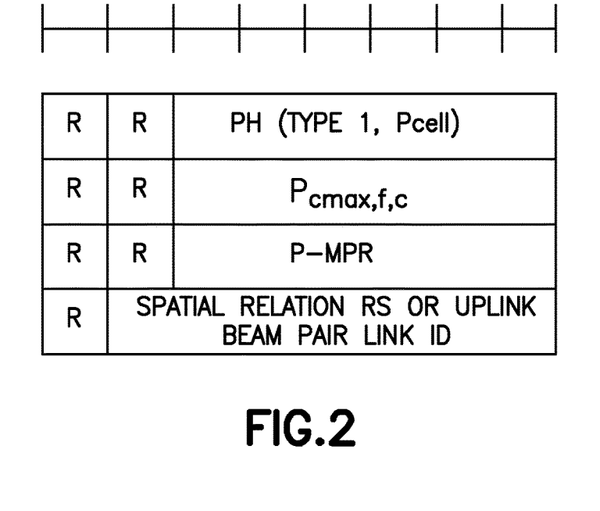
FIG. 2 shows a MAC CE configuration in accordance with an example embodiment of the invention.

FIG. 2 shows operations in accordance with example embodiments of the invention where an MPE indication, i.e. P-MPR indication can be embedded in principle into MAC-CE providing PH but it may be also a separate MAC CE as well, e.g. in case the PH or MPE reporting is not configured for the UE.

As shown in FIG. 2, single entry PHR MAC CE such as in standards at the time of this application could be updated as follows (the italic text of FIG. 2 illustrates a configured field of an MAC CE in accordance with example embodiments of the invention). Here, for example when P-MPR indication due to MPE is provided to some certain beam pair link the MAC CE uses a configured field to indicate a spatial relation or uplink beam pair ID.

Additionally, one of the R bits could be used to implement an "extension field" which is used by the UE to indicate that more PH reports follow for the given cell. For instance, the "PH (type 1, PCell)" field would be encoded based on the real PH of the beam pair link of the PCell used to transmit the PHR while the "extension field" would indicate that there will be another PH reported for the given cell (which can be identified, e.g., by the "Spatial relation RS or uplink beam pair link ID" above). In that case there would be another PH field in the above figure which would indicate a "virtual PH" for the beam link pair not used to transmit the PHR but for which the certain conditions are fulfilled to report the PH.

Figure 3:
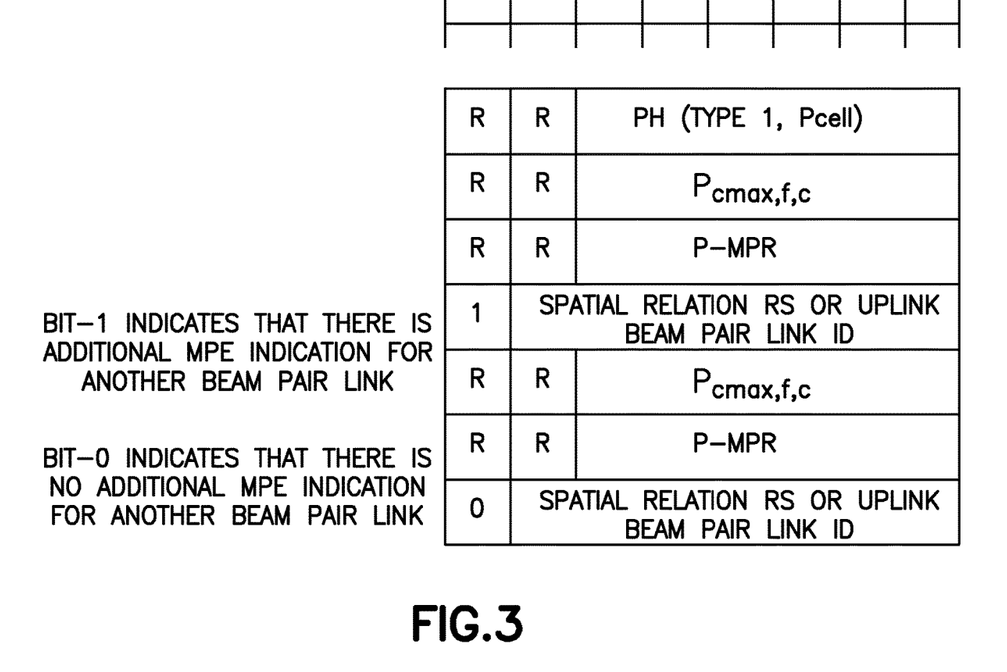
FIG. 3 shows a MAC CE configuration for multiple beam pair links in accordance with an example embodiment of the invention.

For a case of multiple beam pair links per serving cell the indication in accordance with example embodiments of the invention can be seen in FIG. 3. Here, FIG. 3 shows a MAC CE configuration for multiple beam pair links in accordance with an example embodiment of the invention.

As shown in FIG. 3 there is a MAC CE configured with a field including a bit-1. As shown in FIG. 3 the configured field with the bit-1 indicates that there is additional MPE indication for another beam pair link. Further, as shown in FIG. 3 the configured field with the bit-0 indicates that there is no additional MPE indication for another beam pair link.

In accordance with another example embodiment of the invention a multi-entry MAC CE PHR could be updated to indicate MPE indication for multiple beam pair links per serving cell. That is to support carrier aggregation as well with MPE indication per UL beam pair link.

According to proposed scheme, at least the following operations are also supported:

UE measures multiple PHR where each value is calculated from different beam pair,
UE may select beam pair to calculate PHR or be configured beam pairs to calculate PHR;
UE is allowed to select PHR to be reported. For example:
When none of the PHR has value under the threshold, UE selects PHR calculated from the beam currently in use for UL transmission,
When any of the PHR has value under the threshold, UE may report PHR which is lower than the threshold, or multiple of PHRs lower than threshold, and/or
For PHR reporting, UE may report PHR with largest value together with the PHR selected above; and/or
Based on the reception of PHR, gNB determines which beam to be used for UL transmission, or reconfigures beam pair to be used for PHR calculation.

Figure 4:
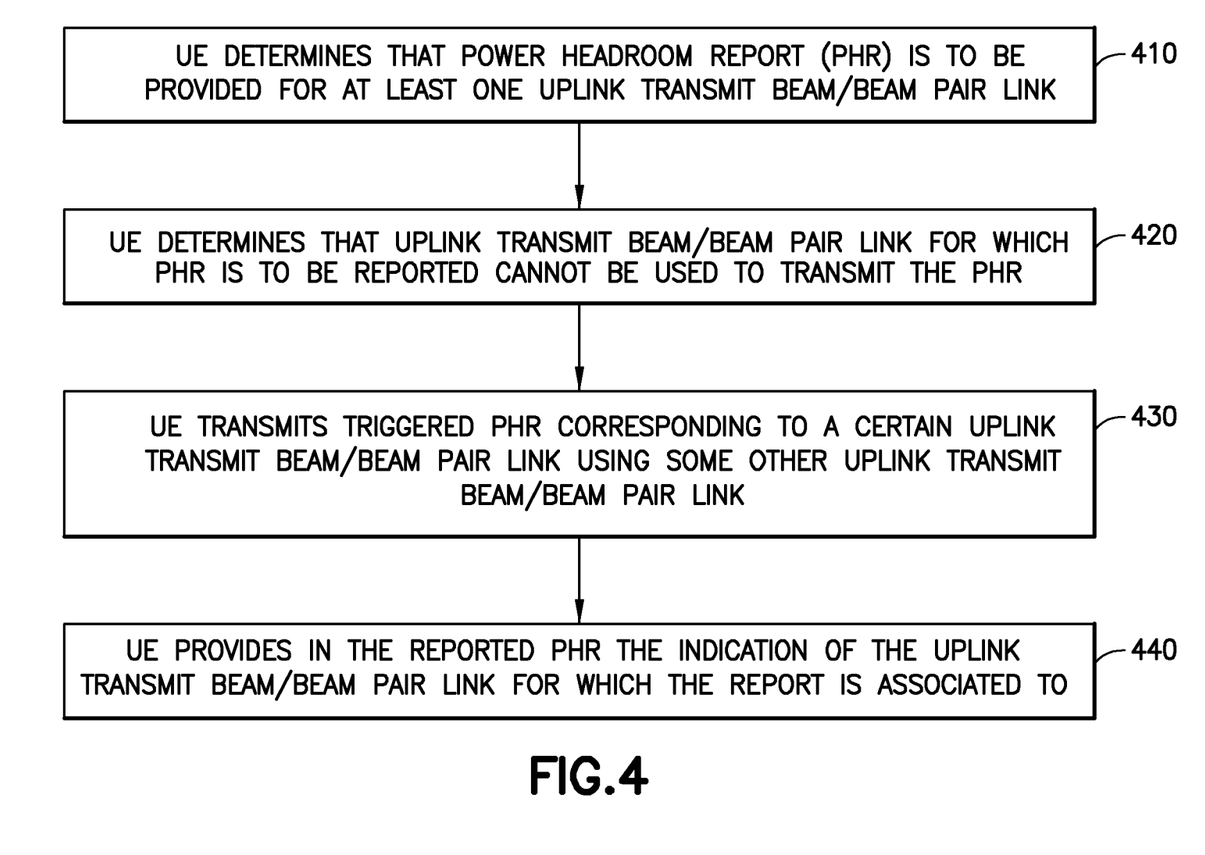
FIG. 4 shows a workflow associated with a workflow description document in accordance with example embodiments of the invention.

FIG. 4 illustrated operations in accordance with example embodiments of the invention which may be performed by a device such as, but not limited to, a device associated with the UE 10, NN 12, NN 13, and/or NCE/MME/SGW/UDM/PCF/AMM/SMF 14 as in FIG. 1.

As shown in step 410 of FIG. 4 a UE determines that power headroom report (PHR) is to be provided in at least one uplink transmit beam and/or beam pair link. As shown in step 420 of FIG. 4 the UE determines that uplink transmit beam and/or beam pair for which PHR is to be reported cannot be used to transmit a PHR. As shown in step 430 of FIG. 4 the UE transits triggered PHR corresponding to a certain uplink transmit beam and/or beam pair link using some other uplink transmit beam and/or beam pair link. Then as shown in step 440 of FIG. 4 the UE provides in the reported PHR the indication of the uplink transmit beam and/or beam pair link for which the report containing the PHR is associated to.

Figure 5:
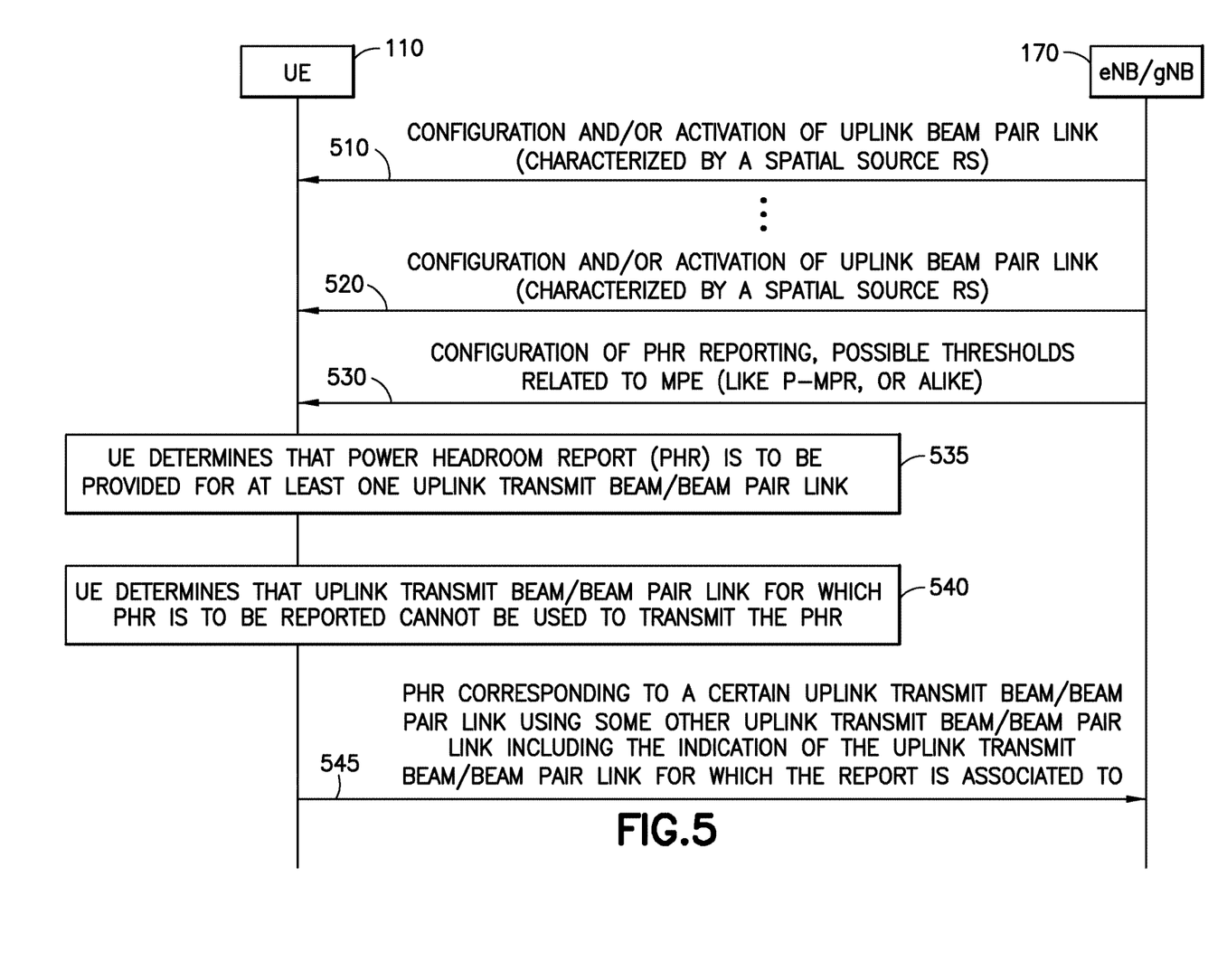
FIG. 5 shows a method which may be performed by a user equipment in accordance with example embodiments of the invention.

FIG. 5 shows a method which may be performed by a device such as, but not limited to, a device associated with the UE 10, NN 12, NN 13, and/or NCE/MME/SGW/UDM/PCF/AMM/SMF 14 as in FIG. 1 in accordance with example embodiments of the invention.

As shown in step 510 of FIG. 5 there is communicated between the eNB/gNB 170 and the UE 110 a configuration and/or activation of uplink beam pair link (characterized by a spatial source RS). As shown in step 520 of FIG. 5 there is communicated between the eNB/gNB 170 and the UE 110 configuration and/or activation of uplink beam pair link (characterized by a spatial source RS). As shown in step 530 of FIG. 5 there is configuration of PHR reporting and/or possible thresholds related to MPE. Such thresholds for example can be P-MPR or similar). As shown in step 535 of FIG. 5 the UE 110 determines the power headroom report (PHR) is t be provided for at least one uplink transmit beam and/or beam pair. As shown in step 540 of FIG. 5 the UE 110 determines that uplink transmit beam and/or beam pair link for which PHR is to be reported cannot be used to transmit the PHR. Then as shown in step 545 of FIG. 5 PHR corresponding to a certain uplink transmit beam and/or beam pair link is using some other uplink transmit beam and/or beam pair link for which the report is associated to.

Figure 6:
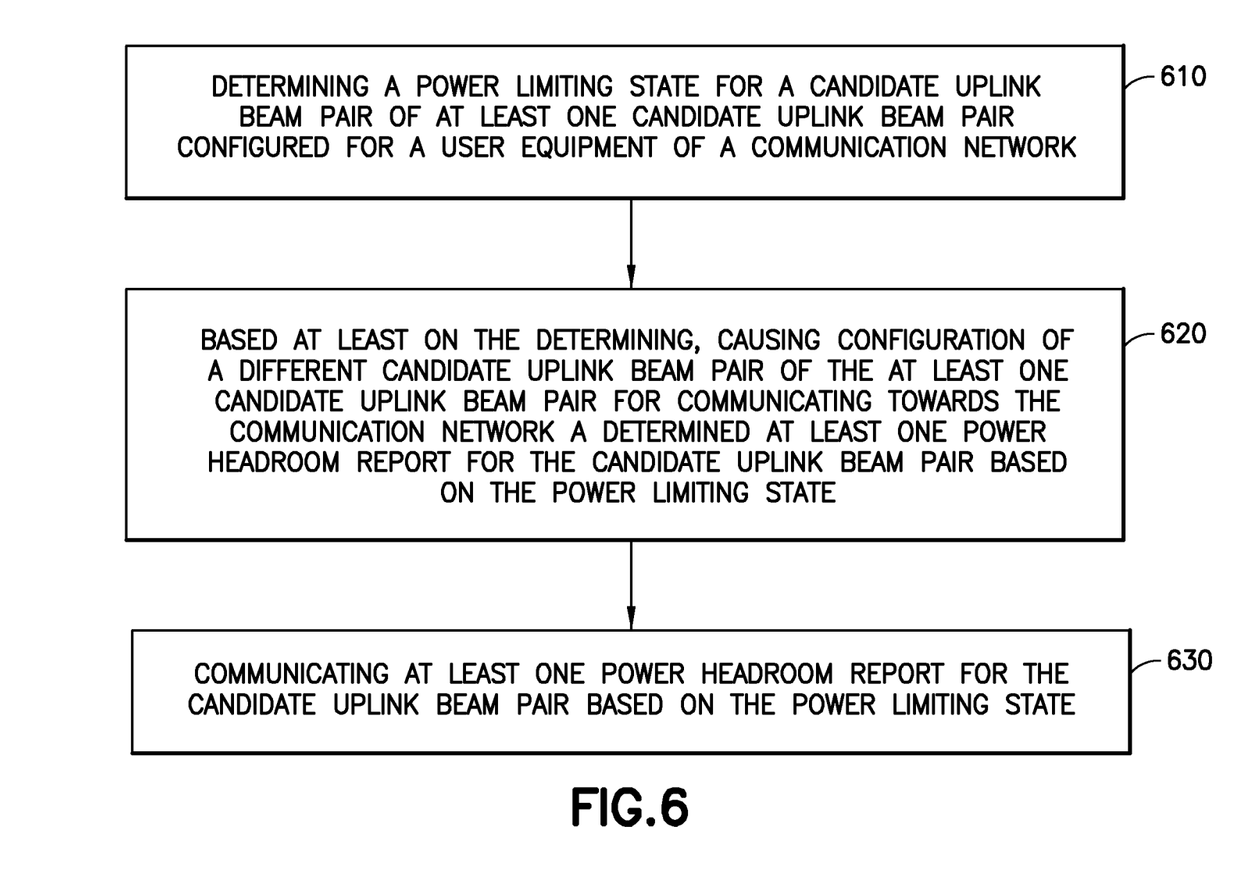
FIG. 6 shows a method which may be performed by an apparatus in accordance with example embodiments of the invention.

FIG. 6 illustrated operations in accordance with example embodiments of the invention which may be performed by a device such as, but not limited to, a device associated with the UE 10, NN 12, NN 13, and/or NCE/MME/SGW/UDM/PCF/AMM/SMF 14 as in FIG. 1. As shown in step 610 of FIG. 6 there is determining a power limiting state for a candidate uplink beam pair of at least one candidate uplink beam pair configured for a user equipment of a communication network. As shown in step 620 of FIG. 6 there is, based at least on the determining, causing configuration of a different candidate uplink beam pair of the at least one candidate uplink beam pair for communicating towards the communication network. Then as shown in step 630 of FIG. 6 there is, communicating at least one power headroom report for the candidate uplink beam pair based on the power limiting state.

In accordance with example embodiments of the invention as described in the paragraph above, wherein the power limiting state is based on at least one of a maximum power reduction operation caused by a maximum permissible exposure constraint for the candidate uplink beam pair exceeding a threshold.

In accordance with example embodiments of the invention as described in the paragraphs above, wherein the power limiting state is based on a negative power headroom determination for the candidate uplink beam pair.

In accordance with example embodiments of the invention as described in the paragraphs above, wherein causing the configuration of the different candidate uplink beam pair for communicating the at least one power headroom report is based on at least one of: determining the at least one power headroom report is negative due to the maximum permissible exposure constraint, determining that a power level reduction of the maximum power reduction operation caused by a maximum permissible exposure constraint exceeds a predetermined threshold, or determining that a measured metric of spatial relation reference signal of the candidate uplink beam pair is below a predetermined threshold.

In accordance with example embodiments of the invention as described in the paragraphs above, wherein the spatial source reference signal (RS) can be one of an uplink or downlink reference signal, and wherein the spatial source reference signal is used by the user equipment to determine a candidate uplink beam pair.

In accordance with example embodiments of the invention as described in the paragraphs above, wherein for a case the spatial source reference signal is a downlink reference signal the user equipment uses a beam for reception of the downlink reference signal as the transmit beam for a candidate uplink beam pair.

In accordance with example embodiments of the invention as described in the paragraphs above, wherein the measured metric comprises at least one of channel state information (CSI), reference signal received power (RSRP), Reference Signal Received Quality (RSRPQ), or Reference signal to noise and interference ratio (RS-SINR) metrics.

In accordance with example embodiments of the invention as described in the paragraphs above, wherein the communicating comprises the user equipment indicating the different candidate uplink beam pair of the at least one candidate uplink beam pair over which the at least one power headroom report is communicated.

In accordance with example embodiments of the invention as described in the paragraphs above, wherein the communicating over the different candidate uplink beam pair is based on at least one of: spatial relation information of the different candidate uplink beam pair, a PUCCH group index associated with the different candidate uplink beam pair, a pathloss reference signal associated with the different candidate uplink beam pair, or a logical index of at least one current active candidate uplink beam pair.

In accordance with example embodiments of the invention as described in the paragraphs above, wherein the communicating comprises: multiplexing over the different candidate uplink beam pair the at least one power headroom report using a medium access control element.

In accordance with example embodiments of the invention as described in the paragraphs above, wherein the communicating comprises implementing at least one extension field for the medium access control element, wherein the at least one extension field comprises indications of at least one of: a power headroom report for the different candidate uplink beam pair, a power headroom report for a given cell, or a virtual power headroom report for a candidate uplink beam pair not used to communicate the power headroom report.

In accordance with example embodiments of the invention as described in the paragraphs above, wherein the given cell is identified based on at least one of a spatial relation reference signal or uplink beam pair link identification.

In accordance with example embodiments of the invention as described in the paragraphs above, wherein the at least one candidate uplink beam pair comprises multiple candidate uplink beam pairs, wherein the implementing comprises implementing two bits for the medium access control element.

In accordance with example embodiments of the invention as described in the paragraphs above, wherein the two bits comprises: a first bit for indicating an additional maximum permissible exposure indication for another candidate uplink beam pair, and a second bit for indicating there is no additional maximum permissible exposure indication for another candidate uplink beam pair In accordance with example embodiments of the invention as described in the paragraphs above, wherein the at least one power headroom report comprises more than one power headroom report, wherein each of the more than one headroom report is for a different one of the more than one power headroom report.

In accordance with example embodiments of the invention as described in the paragraphs above, wherein for a case that a power level reduction level of any of the at least one candidate uplink beam pair is under the predetermined threshold, the communicating is using the at least one candidate uplink beam under the predetermined threshold.

A non-transitory computer-readable medium (MEM 10B, MEM 12B, MEM 13B, and/or MEM 14B as in FIG. 1) storing program code (PROG 10C, PROG 12C, PROG 13C, and/or PROG14C as in FIG. 1), the program code executed by at least one processor (DP 10A, DP 12A, DP 13A, and/or DP 14A as in FIG. 1) to perform the operations as at least described in the paragraphs above.

In accordance with an example embodiment of the invention as described above there is an apparatus comprising: means for determining (TRANS 10D, TRANS 12D, TRANS 13D, and/or TRANS 14D; MEM 10B, MEM 12B, MEM 13B, and/or MEM 14B; PROG 10C, PROG 12C, PROG 13C, and/or PROG14C; and DP 10A, DP 12A, DP 13A, and/or DP 14A as in FIG. 1) for a candidate uplink beam pair of at least one candidate uplink beam pair configured (TRANS 10D, TRANS 12D, TRANS 13D, and/or TRANS 14D; MEM 10B, MEM 12B, MEM 13B, and/or MEM 14B; PROG 10C, PROG 12C, PROG 13C, and/or PROG14C; and DP 10A, DP 12A, DP 13A, and/or DP 14A as in FIG. 1) for a user equipment of a communication network, a maximum power reduction operation caused by a maximum permissible exposure constraint. Means, based on the determining, for causing (TRANS 10D, TRANS 12D, TRANS 13D, and/or TRANS 14D; MEM 10B, MEM 12B, MEM 13B, and/or MEM 14B; PROG 10C, PROG 12C, PROG 13C, and/or PROG14C; and DP 10A, DP 12A, DP 13A, and/or DP 14A as in FIG. 1) configuration of a different candidate uplink beam pair of the at least one candidate uplink beam pair for communicating (TRANS 10D, TRANS 12D, TRANS 13D, and/or TRANS 14D; MEM 10B, MEM 12B, MEM 13B, and/or MEM 14B; PROG 10C, PROG 12C, PROG 13C, and/or PROG14C; and DP 10A, DP 12A, DP 13A, and/or DP 14A as in FIG. 1) towards the communication network. Then means for communicating (TRANS 10D, TRANS 12D, TRANS 13D, and/or TRANS 14D; MEM 10B, MEM 12B, MEM 13B, and/or MEM 14B; PROG 10C, PROG 12C, PROG 13C, and/or PROG14C; and DP 10A, DP 12A, DP 13A, and/or DP 14A as in FIG. 1) at least one power headroom report for the candidate uplink beam pair based on the maximum permissible exposure constraint.

In the example aspect of the invention according to the paragraph above, wherein at least the means for determining, configuring, causing, and communicating comprises transceiver [TRANS 10D, TRANS 12D, TRANS 13D, and/or TRANS 14D as in FIG. 1] a non-transitory computer readable medium [MEM 10B, MEM 12B, MEM 13B, and/or MEM 14B as in FIG. 1] encoded with a computer program [PROG 10C, PROG 12C, PROG 13C, and/or PROG14C as in FIG. 1] executable by at least one processor [DP 10A, DP 12A, DP 13A, and/or DP 14A as in FIG. 1].

Further, it is noted that at least some of the advantages of using example embodiments of the invention as described herein include at least:

Providing robust mechanism to signal MPE indication to the gNB in FR2 and above 52.6 GHz scenarios where UE may operate having multiple uplink beam pair links available; and Sending the indication (beyond informing that the MPE event started) is informing that MPE event has ended on a certain beam pair link, thus enabling fast recovery to the 'original' link, triggered by UE.

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:

(a) hardware-only circuit implementations (such as implementations in only analog and/or digital circuitry);
(b) combinations of hardware circuits and software, such as (as applicable):
 (i) a combination of analog and/or digital hardware circuit(s) with software/firmware; and
 (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
(c) hardware circuit(s) and or processor(s), such as a microprocessor(s) or a portion of a microprocessor(s), that requires software (e.g., firmware) for operation, but the software may not be present when it is not needed for operation."

As used in this application, the term ' circuitry' refers to all of the following:

(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" may be used herein is intended to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples. Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus, comprising:
   at least one processor; and
   at least one non-transitory memory comprising computer program code that, when executed by the at least one processor, cause the apparatus to at least:
   determine a power limiting state for a candidate uplink beam pair configured for a user equipment of a communication network;
   based at least on the determining, cause configuration of a different candidate uplink beam pair for communicating towards the communication network; and
   communicate at least one power headroom report for the candidate uplink beam pair based on the power limiting state, wherein the communication further comprises:
   multiplexing, over the different candidate uplink beam pair, the at least one power headroom report using a medium access control element; and
   implementing at least one extension field for the medium access control element, wherein the implementing comprises implementing two bits for the medium access control element, and wherein the two bits comprises: a first bit for indicating an additional maximum permissible exposure indication for another candidate uplink beam pair, and a second bit for indicating there is no additional maximum permissible exposure indication for another candidate uplink beam pair; and
   wherein the at least one extension field comprises an indication of at least one of:
   a power headroom report for the different candidate uplink beam pair,
   a power headroom report for a given cell, or
   a virtual power headroom report for a candidate uplink beam pair not used to communicate the power headroom report.

2. The apparatus of claim 1, wherein the power limiting state is based on a maximum power reduction operation caused by a maximum permissible exposure constraint for the candidate uplink beam pair exceeding a threshold.

3. The apparatus of claim 1, wherein the power limiting state is based on a negative power headroom determination for the candidate uplink beam pair.

4. The apparatus according to claim 1, wherein causing the configuration of the different candidate uplink beam pair for communicating the at least one power headroom report is based on at least one of:
   determining the at least one power headroom report is negative due to a maximum permissible exposure constrain;
   determining that a power level reduction of a maximum power reduction operation caused by the maximum permissible exposure constraint exceeds a determined threshold; or
   determining that a measured metric of a spatial relation reference signal of the candidate uplink beam pair is below the determined threshold.

5. The apparatus of claim 4, wherein the spatial relation reference signal is one of an uplink reference signal or a downlink reference signal, and wherein the spatial relation reference signal is used by the user equipment to determine a candidate uplink beam pair.

6. The apparatus of claim 4, wherein the measured metric comprises at least one of channel state information, reference signal received power, reference signal received quality, or reference signal to noise and interference ratio metrics.

7. The apparatus of claim 4, wherein the computer program code when executed by the at least one processor, further causes the apparatus to:
   for a case that a power level reduction level of any of the at least one candidate uplink beam pair is under the determined threshold, the communicating is using one of the at least one candidate uplink beam pair under the determined threshold.

8. The apparatus of claim 1, wherein the communicating further comprises the user equipment communicating the at least one power headroom report over the different candidate uplink beam pair.

9. The apparatus of claim 8, wherein the communicating over the different candidate uplink beam pair is based on at least one of:
   spatial relation information of the different candidate uplink beam pair,
   a Physical Uplink Control Channel (PUCCH) group index associated with the different candidate uplink beam pair,
   a pathloss reference signal associated with the different candidate uplink beam pair, or
   a logical index of at least one current active candidate uplink beam pair.

10. The apparatus of claim 1, wherein the given cell is identified based on at least one of a spatial relation reference signal or an uplink beam pair link identification.

11. The apparatus of claim 1, wherein the at least one power headroom report comprises more than one power headroom report, wherein each of the more than one headroom report is for a separate candidate uplink beam pair.

12. A method, comprising:
   determining a power limiting state for a candidate uplink beam pair configured for a user equipment of a communication network;

based at least on the determining, causing configuration of a different candidate uplink beam pair for communicating towards the communication network; and communicating at least one power headroom report for the candidate uplink beam pair based on the power limiting state, wherein the communication further comprises:

multiplexing, over the different candidate uplink beam pair, the at least one power headroom report using a medium access control element; and implementing at least one extension field for the medium access control element, wherein the implementing comprises implementing two bits for the medium access control element, and wherein the two bits comprises: a first bit for indicating an additional maximum permissible exposure indication for another candidate uplink beam pair, and a second bit for indicating there is no additional maximum permissible exposure indication for another candidate uplink beam pair; and wherein the at least one extension field comprises an indication of at least one of:

a power headroom report for the different candidate uplink beam pair, a power headroom report for a given cell, or a virtual power headroom report for a candidate uplink beam pair not used to communicate the power headroom report.

13. The method of claim 12, wherein the power limiting state is based on at least one of a maximum power reduction operation caused by a maximum permissible exposure constraint for the candidate uplink beam pair exceeding a threshold.

14. The method of claim 12, wherein the power limiting state is further based on a negative power headroom determination for the candidate uplink beam pair.

15. The method according to claim 12, wherein causing the configuration of the different candidate uplink beam pair for communicating the at least one power headroom report is based on at least one of:

determining the at least one power headroom report is negative due to a maximum permissible exposure constraint;

determining that a power level reduction of a maximum power reduction operation caused by the maximum permissible exposure constraint exceeds a determined threshold; or determining that a measured metric of a spatial relation reference signal of the candidate uplink beam pair is below the determined threshold.

16. A non-transitory computer-readable medium encoded with instructions that, when executed by a processor, cause a user equipment of a communication network to at least:

determine a power limiting state for a candidate uplink beam pair configured for the user equipment of a communication network;

based at least on the determining, cause configuration of a different candidate uplink beam pair for communicating towards the communication network; and communicate at least one power headroom report for the candidate uplink beam pair based on the power limiting state, wherein the communication further comprises:

multiplexing, over the different candidate uplink beam pair, the at least one power headroom report using a medium access control element; and implementing at least one extension field for the medium access control element, wherein the implementing comprises implementing two bits for the medium access control element, and wherein the two bits comprises: a first bit for indicating an additional maximum permissible exposure indication for another candidate uplink beam pair, and a second bit for indicating there is no additional maximum permissible exposure indication for another candidate uplink beam pair; and wherein the at least one extension field comprises an indication of at least one of:

a power headroom report for the different candidate uplink beam pair, a power headroom report for a given cell, or a virtual power headroom report for a candidate uplink beam pair not used to communicate the power headroom report.

* * * * *